(12) United States Patent
Jordan et al.

(10) Patent No.: US 7,436,775 B2
(45) Date of Patent: Oct. 14, 2008

(54) SOFTWARE CONFIGURABLE CLUSTER-BASED ROUTER USING STOCK PERSONAL COMPUTERS AS CLUSTER NODES

(75) Inventors: John Lawrence Jordan, Ottawa (CA); Peter Rabinovitch, Kanata (CA)

(73) Assignee: Alcatel Lucent, Paris (FR)

( * ) Notice: Subject to any disclaimer, the term of this patent is extended or adjusted under 35 U.S.C. 154(b) by 897 days.

(21) Appl. No.: 10/625,667

(22) Filed: Jul. 24, 2003

(65) Prior Publication Data

US 2005/0018665 A1 Jan. 27, 2005

(51) Int. Cl.
*H04L 12/26* (2006.01)
(52) U.S. Cl. .................. 370/238; 370/235; 370/237
(58) Field of Classification Search ......... 370/235–238, 370/238.1, 389, 390, 392, 395.1, 396, 395.21, 370/395.31, 411, 432, 431, 474, 475, 476, 370/235.1, 236.1, 236.2, 395.2
See application file for complete search history.

(56) References Cited

U.S. PATENT DOCUMENTS

| | | | | |
|---|---|---|---|---|
| 5,224,100 | A * | 6/1993 | Lee et al. | 370/408 |
| 5,970,232 | A * | 10/1999 | Passint et al. | 709/238 |
| 6,044,080 | A * | 3/2000 | Antonov | 370/401 |
| 6,101,181 | A * | 8/2000 | Passint et al. | 370/352 |
| 6,370,584 | B1 * | 4/2002 | Bestavros et al. | 709/238 |
| 6,718,428 | B2 * | 4/2004 | Lee et al. | 711/101 |
| 6,779,039 | B1 * | 8/2004 | Bommareddy et al. | 709/238 |
| 6,973,559 | B1 * | 12/2005 | Deneroff et al. | 712/12 |
| 7,000,033 | B2 * | 2/2006 | Lee | 709/249 |
| 7,027,413 | B2 * | 4/2006 | Lee et al. | 370/255 |
| 2002/0147841 | A1 | 10/2002 | Lee | 709/241 |
| 2003/0058850 | A1 | 3/2003 | Rangarajan et al. | 370/389 |
| 2003/0067925 | A1 | 4/2003 | Choe et al. | 370/400 |

OTHER PUBLICATIONS

Guido Appenzeller & Matthew Holliman, Can Google Route? Building a High-Speed Switch from Commodity Hardware, Q2/2003, www.stanford.edu/class/ee384y/projects/presentations/5appenz.ppt (20 pages).

(Continued)

*Primary Examiner*—Wing F. Chan
*Assistant Examiner*—Mark A. Mais

(57) ABSTRACT

A cluster router architecture and methods for performing distributed routing is presented. Implementations include off-the shelf Personal Computer (PC) hardware. The cluster router architecture includes PC-based router cluster nodes toroidally interconnected in an intra-connection network in multiple dimensions. The cluster router may further make use of a management node. Each router cluster node is provided with the same routing functionality and a node centric configuration enabling each router cluster node by itself or multiple router cluster nodes in the cluster router to provide routing responses for packets pending processing. The method divides packet processing into entry packet processing and routing response processing; and exit processing. Entry packet processing and routing response processing is performed by router cluster nodes receiving packets from communication networks in which the cluster router participates. Exit packet processing is performed by router cluster nodes transmitting packets into communication networks in which the cluster router participates. Advantages are derived from: a configurable, and scalable cluster router design providing a high routing capacity using cost effective stock PC hardware; from the toroidal topology of the intra-connection network which provides a high degree of diversity ensuring resilience to equipment failure, and from the use of the star topology of the management links which reduces management overheads in the intra-connection network.

21 Claims, 7 Drawing Sheets

OTHER PUBLICATIONS

The Click Modular Router Project, www.pdos.Ics.mit.edu/click/, pp. 1-3.

Benjie Chen & Robert Morris, Flexible Control of Parallelism in a Multiprocessor PC Router, Laboratory for Computer Science, Massachusetts Institute of Technology, Cambridge, MA 02139, published in the Proceedings of the USENIX 2001 Annual Technical Conference, Jun. 2001 (pp. 1-14).

Eddie Kohler et al, The Click Modular Router, Laboratory for Computer Science, MIT (pp. 1-33) (An article describing a previous version of this system was published in *Operating Systems Review* 34(5) (*Proceedings of the 17th Symposium on Operating Systems Principles*), (pp. 217-231, Dec. 1999).

Eddie Kohler, The Click Modular Router, submitted to Department of Electrical Engineering and Computer Science, MIT, 2000 (pp. 127).

CBR Implementation, www.cs.duke.edu/~marty/cbr/node2.html, pp. 1-4.

Tore Anders Aamodt: "Design and Implementation Issues for an SCI Cluster Configuration System", SCI Europe, Sep. 28, 1998, pp. 1-7, XP002303112 Bordeaux, the whole document.

Kohler E. et al: "The Click Modular Router", ACM Transactions on Computer Systems, Association for Computing Machinery. New York, US, vol. 18, No. 3, 2000, pp. 263-296 XP002208133, ISSN: 0734-2071, the whole document.

Pradhan P. et al: "Implementation and Evaluation of A QoS—Capable Cluster-Based IP Router", IEEE, Nov. 16, 2002, pp. 1-13, XP002303130, the whole document.

* cited by examiner

SOFTWARE CONFIGURABLE CLUSTER-BASED ROUTER USING STOCK PERSONAL COMPUTERS AS CLUSTER NODES

FIELD OF THE INVENTION

The invention relates to routing packets in packet-switched communication networks, and in particular to methods and apparatus for distributed routing response determination.

BACKGROUND OF THE INVENTION

In the field of packet-switched communications, transported content is conveyed between source and destination communications network nodes in accordance with a store-and-forward discipline. The content to be transported is segmented, and each content segment is encapsulated in a packet by adding headers and trailers. Each packet is transmitted by the source network node into an associated communications network over communication links interconnecting communications network nodes. At each node, a packet is received, stored (buffered) while awaiting a packet processing response, and later forwarded over a subsequent interconnecting link towards the intended destination network node in accordance with: a destination node specification held in the packet header, and forwarding specifications provided via the packet processing response.

Packet processing responses include, but are not limited to: switching, routing, traffic classification, traffic/content filtering, traffic shaping, content/traffic encapsulation, content encryption/decryption, etc. responses. A switching response in the context of a network node processing a particular received packet, specifies that the packet is to be forwarded via a particular output port of the network node. A routing response relates to a switching response determined based on a group of routing criteria. The routing criteria may include, but are not limited to: communication link states, service level specifications, traffic classification, source/destination network node specification, time-of-day, congestion conditions, etc.

One of the benefits of the store-and-forward discipline employed in conveying packets in packet-switched communication networks, stems from an ability of packet-switched networks to route packets around failed/congested communications network infrastructure, diminishing an otherwise need for a redundant communication network infrastructure, to reliably transport packets between source and destination network nodes.

One of the drawbacks of the store-and-forward discipline employed in conveying packets in packet-switched communication networks, stems from delays incurred in obtaining packet processing responses—probably the most notable being the routing response delay which is for the most part non-deterministic.

Single unit, dedicated, hardware implemented router communication network nodes have been developed and deployed with various levels of success. Single unit, packet-switching communications network nodes implementing virtual routers have also been developed and deployed with various levels of success. However content transport capacity over interconnecting links, known as transport bandwidth, continues to increase at exponential rates, as well component miniaturization has enabled the aggregation of large amounts of packet traffic into such dedicated single unit router nodes. A lot of research and development has and is being undertaken in respect of packet router network node design, which has lead to special purpose solutions typically addressing specific packet processing issues and/or to support specific services via dedicated (units) equipment. Router development costs are incurred in designing and validating the routing functionality, as well in designing and validating the special purpose, dedicated, router node hardware.

The single unit, dedicated, hardware implemented routers have evolved from computer-host-type network nodes. The relatively large expense associated with the development and deployment of single unit, special purpose, dedicated, hardware implemented routers has caused researchers to reconsider computer-host-type router implementations as personal computer equipment costs have decreased relative to the computing capability provided. The intent is to leverage readily available personal-computer hardware, which has also undergone separate intense development and standardization, to provide routing functionality comparable to hardware implemented router nodes. Returning to computer-host-type router solutions is in some ways considered a step back, because computer-host router implementations are software-based router implementations lacking packet processing response time guarantees, whereas dedicated router (equipment) nodes tend to implement the routing functionality in hardware which provides bound packet processing response times.

FIG. 1 is a generic functional block diagram showing a legacy Personal Computer (PC) software-based router implementation. The legacy PC router implementation 100, which runs an operating system platform 102 such as, but not limited to, Linux, includes software-implemented routing functionality, such as, but not limited to: packet filtering 110, packet header modification 112, packet queuing 114, scheduling 116 etc. The routing behavior of the legacy PC router 100 can be re-configured by re-coding the desired router functionality (110-116). Typically legacy PC router implementations 100 execute optimized special-purpose code to effect routing. While special-purpose code provides some efficiencies in providing routing responses, such solutions are not necessarily optimal under all conditions and typically lead to proprietary implementations addressing particular service deployments. Over-optimization leads to inflexible and expensive to maintain solutions.

Improvements towards an improved PC-based router implementation includes the configurable Click router framework project at the Massachusetts Institute of Technology, U.S.A., a description of which can be found at http://www.pdocs.lcs.mit.edu/click/. Various developers have contributed to the development of the Click router framework including: Eddie Kohler (Ph.D. thesis student), Professor M. Frans Kaashoek and Professor Robert Morris, Benjie Chen, and John Jannotti.

The Click router framework development started as an investigation into possible routing response processing improvements achievable by codifying discrete router functional blocks which, via a high level router description language, could be flexibly combined to implement (PC-based) router functionality at reduced router code maintenance overheads. FIG. 2 shows an exemplary prior art Click router configuration 200 implementing an exemplary Internet Protocol (IP) router, the configuration 200 specifying discrete router functional blocks and packet processing flows defined between the discrete router functional blocks.

Various levels of success were attained, including the realization that, in order to achieve superior packet throughput through a single standard PC-based router, running a typical operating system, a closer coupling between the operating system, router software (Click in the MIT investigation), and the Network Interface Cards (NIC) (physical ports) was necessary. The typical interrupt handling technique ubiquitously used by network interface cards to report receiving a packet, and to announce availability to transmit a packet, was replaced by a polling technique to eliminate "receive livelock" conditions. It was found that using poling techniques, minimum-sized packet throughput increased fourfold. Minimum-sized packets are the most demanding of all types of packets when it comes to providing a processing response, as PC central processor resources are consumed in proportion to the number of packets processed not in proportion to the content bandwidth conveyed. The bandwidth conveyed is ultimately limited by the bandwidth of the PC bus. Statistically however, the median packet size is relatively small in a typical use environment.

Other results of the MIT Click investigation, include the definition of only sixteen generic discrete functional router blocks as a framework for implementing comprehensive packet processing responses—other specific functional router blocks being derived from the sixteen generic functional router blocks. In providing packet processing responses, the prior art typically concentrates on queuing disciplines and queue service disciplines. In the prior art, each routing function (filter 110, process 112, queue 114, schedule 116) contended for CPU time and cache. The Click investigation, however, looked into potential improvements achievable by prioritizing packet processing flows within a single PC-based router, and found that improvements may be benefited from careful allocation of CPU processing resources to packet processing flows which reduced CPU cache misses.

Further results of the MIT Click investigation, include the adaptation of the Click router framework software code to operate on a multi-processor-single-PC-based platform. The investigation continued toward prioritizing packet processing flows seeking benefits from careful allocation of the processing resources of all CPUs of the multiple-processor-PC platform to packet processing flows. CPU allocation to port-related packet processing flows seemed to provide best results by leveraging parallel processing over the multitude of processors (a maximum of 4 CPUs per PC-based router were employed in the investigation). However, it was found that one of the most detrimental of overheads were cache misses whose minimization correlated with increased packet processing throughput.

However, the sharing of a single data bus between the multiple processors of the single-PC router implementation represented a limitation as, during periods of high packet throughput, the multiple CPUs contend for the single data bus. Therefore, implementing large capacity routers in accordance with the MIT Click investigation is difficult and/or very expensive to achieve because a very fast PC computing platform is required. This is due to the fact that the Click routing framework design is based on employing a single PC platform, and hence its performance is limited by the speed of the PC platform.

In the field of distributed computing there is a current push to achieve network computing. Recent developments include the Scalable Coherent Interface (SCI) initiative which focuses on using new high bandwidth and low latency memory-mapped networks to build high performance cluster computing servers. The work in progress includes SCIOS, published on the Internet at http://sci-serv.inrialpes.fr/SciOS/whatis_scios.html, (contributor: Mr. Emmanuel Cecchet, France), which is an operating system module for the Linux operating system kernel offering services for managing resources in a cluster of Linux network nodes interconnected in an SCI network. The work in progress also includes SCIFS, published on the Internet at http://sci-serv.inrialpes.fr/SciFS/whatis_scifs.html, which is a file system module for the Linux kernel offering services for implementing a distributed shared virtual memory, built on top of SCIOS, using a memory mapped file concept.

The success of distributed computing towards achieving network computing, including the SCIOS/SCIFS initiative, hinges on the type of computation necessary to solve a problem. Network computing provides computation efficiencies, if the necessary work to solve the problem can be divided into discrete and independent work units, such that the processing of each work unit has a minimal to no influence on the processing of other work units. A successful such network computing implementation is the SETI@Home project where processing each work unit involves determining self correlation between recorded signals in a single work unit.

Investigations into distributed routing must take into account the issues pointed out by the Click initiative, that of packet processing flows traversing multiple routing functional blocks. The single PC-platform-based Click router framework investigation does not address network computing implementation issues and it is difficult to envision how, on their own, the results of the Click router framework investigation can be employed directly to provide distributed routing.

A prior art attempt towards distributed routing was made by Martin Gilbert, Richard Kisley, Prachi Thakar of Duke University, U.S.A., published on the Internet at http://www.cs.duke.edu/~marty/cbr/, entitled "Scalable Routing Through Clusters". Gilbert et al. employed an experimental setup having two interconnected but otherwise independent PC-based routers.

Further, Gilbert et al. found that, packets which cannot be received and sent from the same entry router node in the cluster router, must be forwarded from the entry router node over an intra-connection network to the exit router node, from where the packets are forwarded into an associated external communications network.

Gilbert et al. realized that, for a cluster of PC-based routers to operate as a "single" router, it is was necessary for the Time-To-Live (TTL) packet header value to be decremented only once by exit nodes in the cluster. Gilbert et al. used a packet tagging technique and packet TTL decrement suppression code to prevent premature packet TTL decrements. The proposed solution actually introduced a problem: low TTL value packets are processed through the router cluster (in the Gilbert et al. implementation by both PC-based clusters) only to be dropped by exit cluster nodes, the corresponding Internet Control Message Protocol (ICMP) messages being sent from the exit router node and routed back through the router cluster (2 PC routers) towards the source. The proposed solution was extended to identify packets bearing low packet TTL values to be processed immediately, at entry nodes in the cluster, rather than processing these packets through the cluster.

To implement the intra-connection network, Gilbert et al. found it necessary to employ an additional lightweight protocol and a hierarchical naming scheme for router nodes in the cluster. The proposed solution was not without problems, of which Gilbert et al. identified: a routing overhead consisting of additional routing messages which needed to be exchanged in the cluster to propagate routing information related to external and internal changes to the cluster; extra protocol stack handling due to packets traversing several router nodes which involved examining each packet being processed at the IP layer to determine correct forwarding; and bandwidth reservation in the intra-connection network had to take into account the internal overhead. Although recognized as not ideal, Gilbert et al. propose employing statically-coded routing at each router node in the cluster to address the route-information sharing problem. Gilbert et al. state that "the ideal solution would be that the intra-connection network is completely transparent", and provide only a characterization stressing that: "[as the number of router nodes in the cluster increases], the latency associated with the extra protocol translation and physical link traversal on the intra-connection network will limit end-to-end throughput." Gilbert et al. call for employing, perhaps future faster packet transport technologies to alleviate these issues in order to achieve the stated goals of their presented solution.

Yet another prior art investigation into distributed routing is presented in FIG. 3 which shows an architecture referred to as a cluster-based router (CbR). The 4×4 cluster-based router 300 shown is comprised of four 2×2 router modules 310. Each of the routing modules 310 is implemented on a PC computing platform having gigabit Ethernet (1 GE), or similar, high speed interfaces 320. The 2×2 router modules 310 are interconnected in a manner that forms a non-blocking 4×4 routing architecture. Different sizes and arrangements of router modules 310 are possible to form different sized router clusters 300. Furthermore, a hierarchy of cluster-based routers 300 can be used to form even larger cluster-based routers. For example, a 16×16 CbR could be created from four of the 4×4 cluster-based routers 300 shown in FIG. 3. General details of this prior art proposal used to be found on the Internet at http://www.stanford.edu/class/ee384y/, but the details are no longer published.

The CbR router 300 lacks flexibility in configuring thereof to address specific routing issues, and changes in routing functionality require new hardware or new code development. Moreover, it is apparent that a scalability issue exists as the number of 2×2 router modules 310 increases as $O(N^2)$ for an $O(N)$ growth in ports.

Another prior art investigation into the feasibility of using a Clos network to implement distributed routing is entitled "Can Google Route?" and was presented by Guido Appenzeller and Mathew Holliman. The Clos network architecture is proposed because such a design is non-blocking.

Appenzeller and Holliman show a dramatic increase in cost-per-gigabit with total throughput for single unit dedicated routers. Appenzeller and Holliman show that using Clos-network-type router clusters is only more economical than single unit dedicated hardware routers for implementations involving very large numbers of ports. In general Clos networks employ a hierarchy of nodes: edge and core. Edge nodes exchange packets with external communications networks while core nodes do not, which is why, in general, switching N inputs to N outputs requires $(N/4)\log_4 N(1.5)^{\log_2 \log_4 N}$ which increases $O((N/4)\log_4 N)$ with N.

Further Appenzeller and Holliman confirm the results of the MIT Click investigation, in that the use of PC bus interrupt techniques represents a packet throughput bottleneck and propose aggregating short packets. To implement the proposal, the network interface cards employed must have large buffers operating at line speed which negatively impacts the cost of such an deployment. While the MIT Click investigation proposes to use optimized network interface card polling techniques, Appenzeller and Holliman propose a less optimum solution of using Linux in halted mode.

In view of the aforementioned shortcomings of the prior art investigations, what is desired is a low-cost router that is flexible, and scalable in routing capacity and port count.

SUMMARY OF THE INVENTION

In accordance with an aspect of the invention, a cluster-based router is provided. The cluster router includes a plurality of equivalent interconnected router cluster nodes, the routing capacity of the cluster router increasing substantially O(N) with the number N of router cluster nodes in the cluster router. A plurality of cluster router internal links interconnect router cluster nodes forming an intra-connection network ensuring a high path diversity in providing resiliency to failures. Each router cluster node has a group of cluster router external links enabling packet exchange with a plurality of external communication network nodes. And, each router cluster node operates in accordance with a provisioned router-cluster-node-centric configuration to effect distributed routing of the conveyed packets. The equivalency between the router cluster nodes providing a scalable cluster router.

In accordance with another aspect of the invention, the intra-connection network further comprises an n dimensional toroidal topology. 2*n internal links interconnect each router cluster node with 2*n adjacent neighboring router cluster nodes; the routing capacity of the cluster router being increased substantially linearly by adding an n-1 dimensional slice of router cluster nodes to the cluster router.

In accordance with a further aspect of the invention, the cluster router further includes: at least one management node; and a plurality of management links interconnecting the at least one management node with the plurality of router cluster nodes. The plurality of management links enable one of out-of-band: configuration deployment to each router cluster node, router cluster node initialization, and reporting functionality. Employing the plurality of management links, reduces an in-band cluster router management overhead.

In accordance with a further aspect of the invention, the plurality of management links from a one of a star and bus topology.

In accordance with a further aspect of the invention, the cluster router further includes an internal addressing process dynamically determining router cluster node addressing.

In accordance with a further aspect of the invention, the cluster router further includes an external addressing process dynamically determining a router cluster address.

In accordance with a further aspect of the invention, a router cluster node of a plurality of router cluster nodes interconnected in a cluster router is provided. The router cluster node includes a plurality of cluster router internal interconnecting links connected thereto, the internal interconnecting links enabling the exchange of packets with adjacent router cluster nodes in the cluster router. At least one cluster router external link connected thereto, the at least one external link enabling exchange of packets between external communications network nodes and the cluster router. And, a router-cluster-node-centric configuration to effect distributed routing of the conveyed packets. The equivalency between router cluster nodes in the cluster router providing a scalable router.

In accordance with a further aspect of the invention, a router-cluster-node-centric configuration is provided. The router-cluster-node-centric configuration enables the provision of a distributed packet routing response in a cluster router having a plurality of router cluster nodes. The configuration specifies a plurality of routing functional blocks; and at least one cluster-node-centric packet processing flow, via the plurality of routing functional blocks. The routing of packets received at the cluster router is effected employing one of a single router cluster node and a group of router cluster nodes.

In accordance with a further aspect of the invention, the router-cluster-node-centric configuration includes: an entryand-routing processing packet processing flow specification; a transit packet processing flow specification; and an exit packet processing packet processing flow specification. The packet processing flow specifications enable a received packet to undergo entry-and-routing processing at an entry router cluster node, optionally transit via at least one intermediary router cluster node, and undergo exit processing at an exit router cluster node.

In accordance with a further aspect of the invention, the router-cluster-node-centric configuration employs a tag conveyed with each packet within the cluster router infrastructure. The tag holds specifiers tracking packet processing within the cluster router.

In accordance with yet another aspect of the invention, each tag holds a tag time-to-live specification decremented while the associate packet propagates via router cluster nodes in the cluster. The packet is discarded when the time-to-live specification is zero and the packet has not reached a corresponding exit router cluster node thereby reducing transport overheads.

Advantages are derived from: a configurable, and scalable cluster router design providing a high routing capacity using cost effective stock PC hardware; from the toroidal topology of the intra-connection network which provides a high degree of diversity ensuring resilience to equipment failure, and from the use of the star topology of the management links which reduces management overheads in the intra-connection network.

BRIEF DESCRIPTION OF THE DRAWINGS

The features and advantages of the invention will become more apparent from the following detailed description of the preferred embodiments with reference to the attached diagrams wherein.

It will be noted that in the attached diagrams like features bear similar labels.

DETAILED DESCRIPTION OF THE EMBODIMENTS

Figure 1:
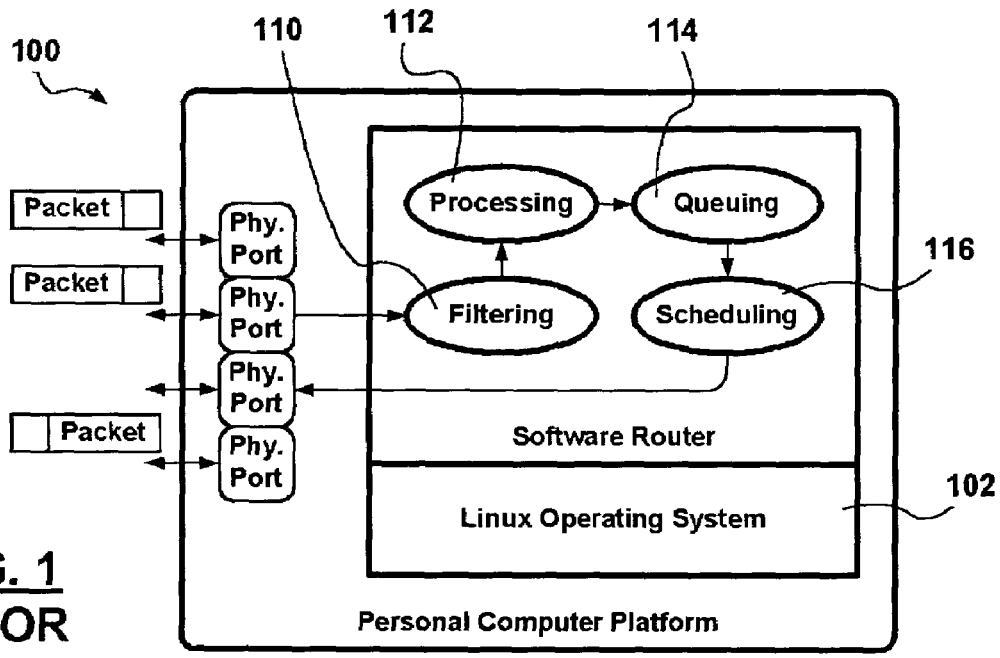
FIG. 1 is a schematic diagram showing elements implementing a prior art personal computer executing packet routing software code.
Figure 3:
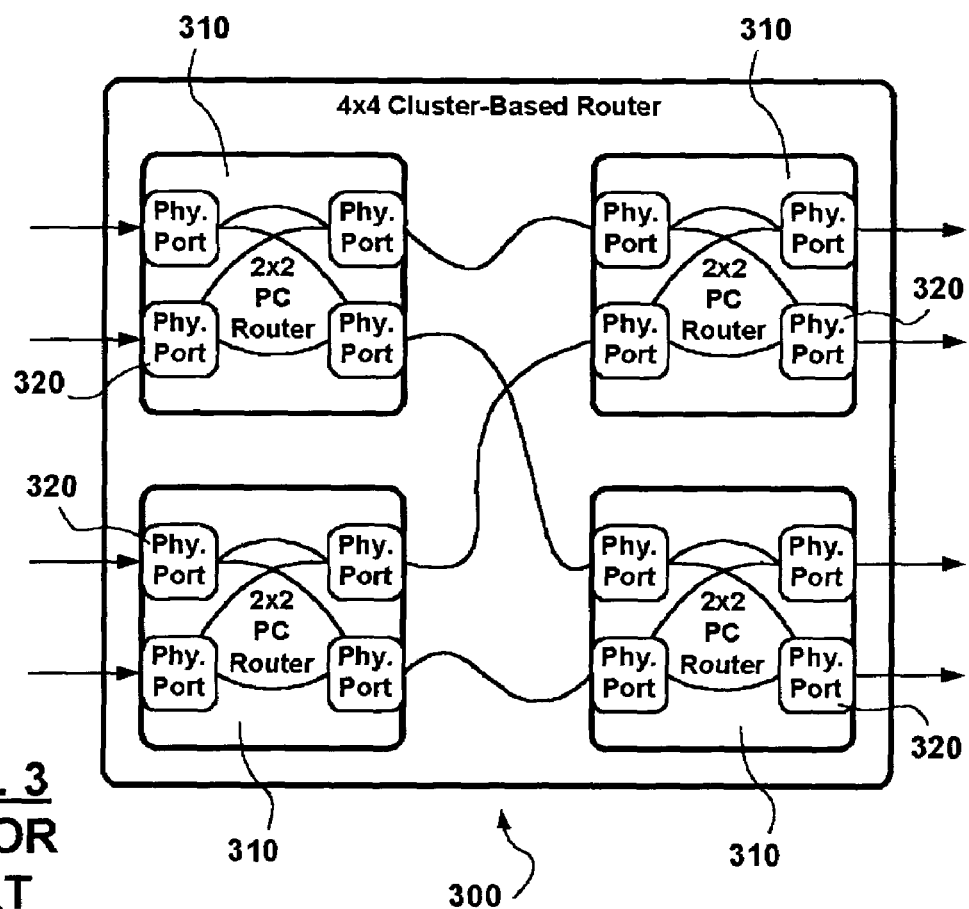
FIG. 3 is a schematic diagram showing a prior art non-blocking cluster-based router architecture.
Figure 2:
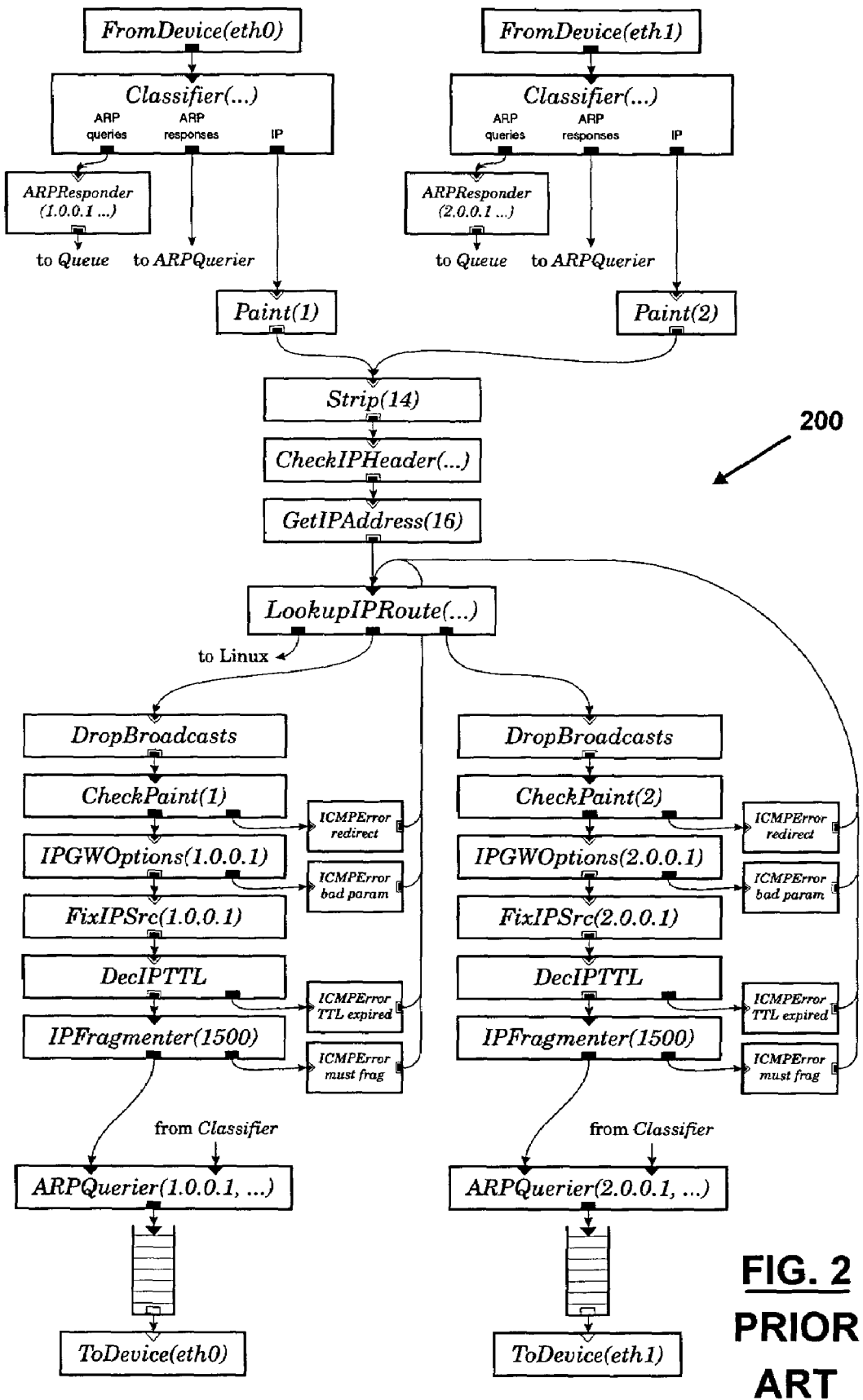
FIG. 2 is a schematic diagram showing packet processing flows directing packets between router functional blocks in accordance with a Click configuration implementing an exemplary IP router.
Figure 4:
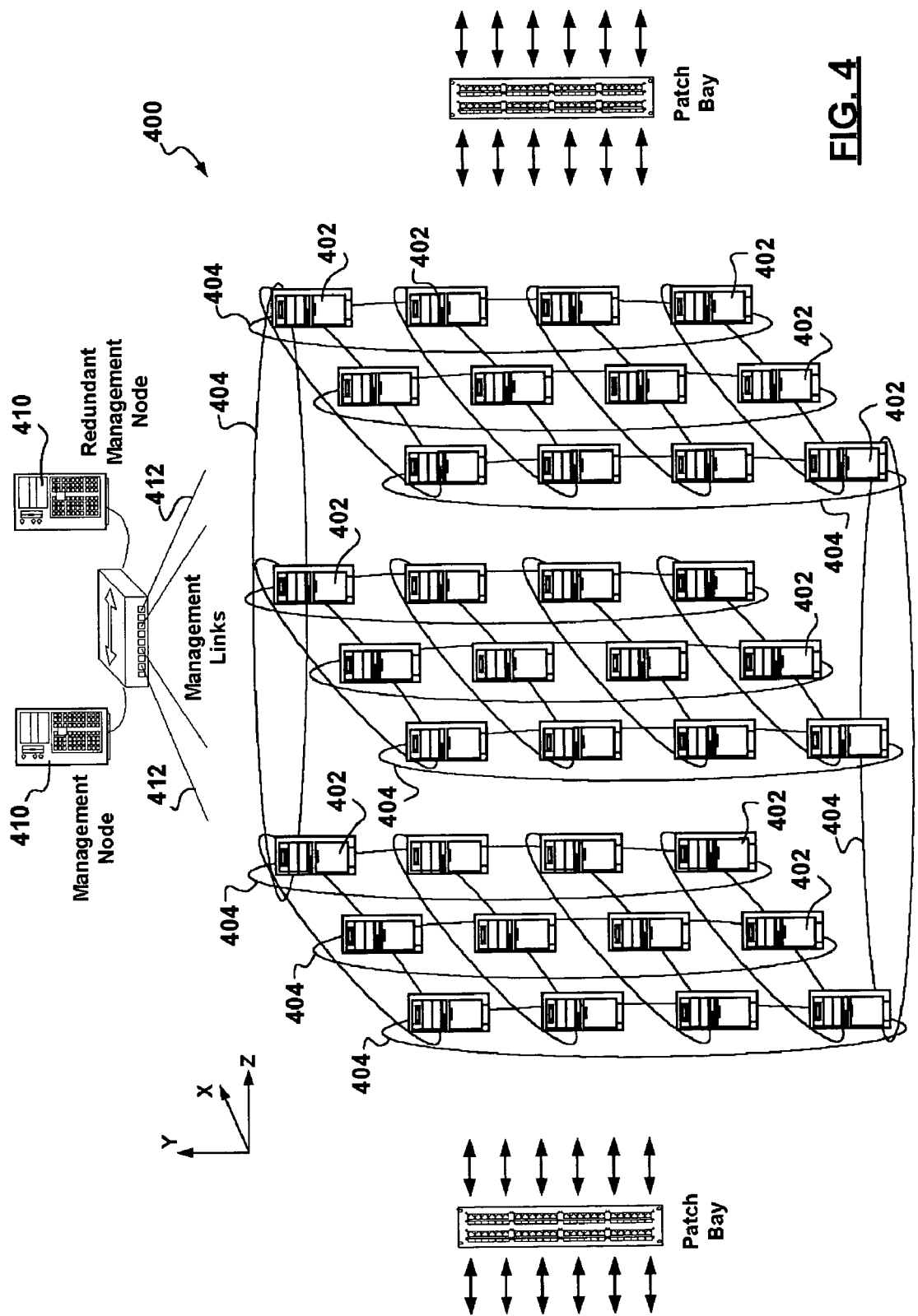
FIG. 4 is a schematic diagram showing, in accordance with an exemplary embodiment of the invention, a cluster-based router architecture.

In accordance with an exemplary embodiment of the invention, FIG. 4 shows an exemplary cluster-based router implementation 400 which includes a 3×4×3 arrangement (cluster) of PC router cluster nodes 402 interconnected in accordance with a toroidal topology. The invention is not limited to the number of PCs or to the topology shown. An arbitrary number of router cluster nodes 402 (typically a large number) may be interconnected in accordance with various topologies without limiting the invention. The choice of the number of router cluster nodes 402 is chosen to obtain a required routing capacity, while the chosen topology employed is a balance between advantages and disadvantages including, but not limited to: cost, complexity, delay, blocking probability, etc. which may be dependent on the routing capacity.

In accordance with the exemplary embodiment shown, the individual router cluster nodes 402 are arranged in x, y, and z slices, and each router cluster node 402 is physically connected 404 to adjacent router cluster nodes 402 in the x, y, and z directions. In is pointed out that only two z-toroidal interconnections are shown in order to improve clarity of FIG. 4, however every router cluster node 402 participates in a z-toroid of which there are twelve in total. The toroidal interconnections 404 shown, implement a dedicated cluster intra-connection network. In order to simplify the presentation of the relevant concepts, interconnections 404 will be referred to herein as internal interconnection links 404 (connected to internal ports) without limiting the invention thereto. Each internal interconnecting link 404 between any two router cluster nodes 402 may either be a unidirectional or a bi-directional link without limiting the invention.

Wraparound internal interconnection links 404 complete toroidal interconnectivity ensuring that every router cluster node 402 has, in accordance with the exemplary toroidal topology employed, six adjacent router cluster nodes 402 to provide path diversity. Should any router cluster node 402 or internal interconnecting link 404 fail, the toroidal topology ensures that other paths between any source and destination router cluster nodes 402 exist.

In accordance with the exemplary toroidal topology of the exemplary embodiment of the invention, should a number of the router cluster nodes 402 or interconnecting links 404 fail, the cluster router 400 will continue to route packets, perhaps, but not necessarily, at a reduced routing capacity until the failed infrastructure is brought back on-line. Whether packet routing capacity is affected by a particular infrastructure failure, is dependent on the actual packet traffic patterns within the cluster router 400. However, as long as routing capacity and packet transport capacity is still available in the cluster router 400, the toroidal interconnectivity provides the possibility for work distribution over the remaining router cluster nodes 402.

The toroidal topology employed can be extended to multiple dimensions: rather than linking each router cluster node 402 only to neighbor router cluster nodes 402 in the x, y and z direction, each router cluster node 402 can be linked to 2*n neighbors in n dimensions. The additional interconnectivity provides: increased path diversity thereby reducing blocking probability, reductions in the number of hops between entry and exit router cluster node 402 pairs, reductions in transmission delay, and provides the possibility for work distribution away from congested router cluster nodes 402 (congestion mitigation). Theses advantages come at a cost of increased wiring, maintenance, work distribution decision making, etc. complexity; and an increased cost of: a large number of cables, a correspondingly large number of network interface cards, PC motherboards adapted to interconnect with numerous network interface cards, multiported network interface cards, etc. Thus the choice of a specific interconnection density is an design choice to be made based on specific application environment requirements.

In accordance with the exemplary embodiment of the invention, employing toroidal interconnectivity between the router cluster nodes 402 enables all router cluster nodes 402 to be equivalent. In particular the toroidal topology does not dictate which router cluster nodes 402 are edge or core router cluster nodes 402. Such designations may of course be made logically, if necessary, and may only apply to a specific service being provisioned. However depending on each particular implementation, such designations may bring about a management overhead. The equivalency between router cluster nodes 402 enables each router cluster node 402 to have external physical links (schematically shown as patch bays) providing physical connectivity to communications network(s) in which the cluster router 400 participates. Therefore, in accordance with the exemplary embodiment of the invention, each router cluster node 402 may act as an entry, core, and/or exit router cluster node 402 relative to the packet traffic processed by the cluster router 400.

The router cluster node equivalency, provided via the toroidal topology, provides a highly scalable packet routing capacity and port count increasing monotonically ~O(N) with the number N of router cluster nodes 402 in the cluster router 400. Additional capacity may be added typically by adding another x, y, or z slice (n-1 dimensional plane) of router cluster nodes 402 without requiring replacement or expansion of the existing infrastructure.

The cluster router 400 may be controlled by management software allowing an operator to configure the behavior of each router cluster node 402 and therefore of the entire cluster router 400 via a software-based specification language with appropriately coded routing functionality blocks (a modified version of the Click routing framework being an example) to affect packet routing in accordance with the exemplary embodiment of the invention.

In accordance with an exemplary implementation of the exemplary embodiment of the invention, at least one additional node 410, shown in FIG. 4, may act as a management node responsible for: startup, initial configuration of each router cluster node 402 in the cluster router 400, lookup table synchronization, monitoring, performance reporting, billing, authentication, etc.

In accordance with the exemplary implementation of the exemplary embodiment of the invention, cluster management software, if executing on management nodes 410, communicates with router cluster nodes 402 via dedicated management links 412 ensuring that the cluster intra-connection network does not incur an in-band management overhead. It is envisioned that the management links 412 need not necessitate high bandwidths and therefore the cluster router 400 need not incur a high deployment cost overhead.

In FIG. 4, the management links 412 are shown to form a star topology between the management nodes 410 and the router cluster nodes 402. No such limitation is implied in respect of the invention, a variety of other topologies may be employed including bus topologies. While employing a bus topology provides native broadcast capabilities, particularly benefiting lookup table synchronization, without necessarily providing a change in the number of management links 412 when compared to the star topology, employing a bus topology exposes the cluster router 400 to a collision overhead in the management links 412. The collision overhead may be mitigated by employing higher bandwidth infrastructure for management links 412 of the bus topology or by employing multiple busses, both adding significant costs to such an implementation. Depending on the size of the cluster router 400 the benefits of the native broadcast capabilities in employing a bus topology may overweigh the cost incurred by the collision overhead. The actual implementation of the management network is therefore left to design choice.

In accordance with an exemplary implementation, the management links 412 may be implemented as serial links. Serial links employ serial ports typically available directly on the motherboard of each PC router cluster node 402 reducing bus connector requirements imposed on the design of each PC motherboard. While the aggregation of all serial links at the management node may require expensive aggregation equipment, such aggregation equipment exists and enjoys standardization.

In accordance with another embodiment of the invention, at least one router cluster node 402 is designated as a management node (410) providing management functionality either on a dedicated basis of in conjunction with providing routing functionality. In case a failure is experienced by the router cluster node designated as the management node, another router cluster node 402 may be designated as the management node (410) on short order without requiring infrastructure modifications to the cluster router 400.

In accordance with another exemplary implementation, management functionality employs in-band signaling and messaging while incurring a small management overhead.

In accordance with the exemplary embodiment of the invention, the same routing functional block definitions are provided to each router cluster node 402 to ensure that each cluster node is capable to perform every and any routing functionality necessary. Details regarding the necessary routing functionality blocks is provided herein below with reference to FIG. 5 and FIG. 6.

Therefore, in accordance with the exemplary embodiment of the invention, the router cluster node configuration specifies cluster-node-centric packet processing flows within each router cluster node 402 such that each router cluster node 402 by itself, and/or the aggregate all router cluster nodes 402 in the cluster router 400 are able to provide packet routing functionality. Details of exemplary cluster-router-node-centric configurations are provided herein below with respect to FIG. 5 and FIG. 6.

For easy understanding of the concepts presented herein and without limiting the invention thereto, router cluster node physical ports are designated as: internal ports, external ports, and loopback ports. Internal ports terminate cluster router internal interconnecting links 404 participating in the intra-connection network implementing the toroidal topology of the cluster router 400. External ports terminate cluster router external links to communication network nodes external to the cluster router 400 (see patch bays in FIG. 4). The loopback ports enable each router cluster node 402 to provide all the necessary and related routing functionality need to process a received packet especially when the packet is to be sent towards the intended destination via an external link associated to the same router cluster node 402 which received the packet.

In order for the cluster router implementation presented herein to replace a single router, not only is it necessary for packets to be processed by the router cluster nodes 402 of the entire cluster router 400 as if they were processed by a single router, but the entire cluster router 400 must appear to external communications networks and nodes as a single router. Adherence to the requirement is complicated by the fact that different external links are connected to different router cluster nodes 402 in the cluster router 400.

An addressing scheme, perhaps as simple as using Media Access Control (MAC) addressing may be relied on. Internet Protocol addressing may also be used, however reliance on such use, as packets hop from router cluster node 402 to router cluster node 402, may lead to a lot of unnecessary protocol stack processing. In using MAC addressing to refer to each router cluster node 402, each physical port has a globally unique MAC address ascribed thereto during manufacturing thereof, the MAC address of a particular router cluster node 402 may be set to the lowest MAC address value of all of the physical ports associated therewith. It may be necessary that only physical ports used to implement the cluster intra-connection network be considered in an internal router cluster node addressing scheme to ensure that packets do not spill out of the cluster router 400 prematurely while propagating between cluster router nodes 402. In order for the aggregate of router cluster nodes 402 to appear as a single router to external communications networks, the MAC address of the cluster router 400 may be set to the lowest MAC address of all router cluster node ingress and egress external ports (external addressing scheme).

In accordance with an exemplary implementation of the exemplary embodiment of the invention, the MAC address of the cluster router 400 is determined by the router cluster nodes 402 in the cluster router 400 cooperatively. The invention is not limited to this particular method of determining the address of the cluster router 400. However, employing methods of dynamic internal cluster router MAC address determination, takes into account that the router cluster node 402 with the smallest MAC address may be removed and installed at another location in an associated communications network thus preventing packet misdirection.

In accordance with another exemplary implementation of the exemplary embodiment of the invention, the external MAC address of the cluster router 400 may be determined by a management node 410. If the management node is used solely for management of the cluster router 400, then the MAC address of the management node 410 may be used as the MAC address of the entire cluster router 400. If a group of redundant management nodes are used, then the group of management nodes may collectively employ a dynamic external MAC address determination scheme which takes into account that any one of the management nodes 410 may fail or may be relocated in an associated communications network.

In accordance with the exemplary embodiment of the invention, router cluster nodes 402 in the cluster router 400 may employ only a reduced protocol stack in implementing the cluster intra-connection network. If the cluster router 400 is exemplary employed for routing IP packets, the router cluster nodes 402 may only implement Ethernet encapsulation in the cluster intra-connection network.

Having received a routing response, a packet in transit towards the exit router cluster node 402, if unchecked, may circle around the redundant intra-connection network (404) forever introducing an uncontrollable transport bandwidth overhead.

In accordance with the exemplary embodiment of the invention, each packet is tagged to identify the received packet as one having received a routing response and propagating through the cluster router 400 towards the intended exit router cluster node 402. A variety of tagging means may be employed including, but not limited to: using optional headers in packets, adding packet trailers, and/or encapsulating the received packet with additional (Ethernet) headers having cluster router relevance only. Upon arriving at the specified exit router cluster node 402, the tag is removed.

In accordance with the exemplary embodiment of the invention, a TagTTL value is specified in the tag for each tagged packet the TagTTL having cluster router 400 relevance only. An initial MaxTagTTL value would be set to an empirically determined value typically dependent on the size of the cluster router 400. The MaxTagTTL value must be set high enough to enable the packet to traverse the entire cluster router 400, yet the MaxTagTTL value must be set low enough to minimize transport overheads.

In accordance with the exemplary embodiment of the invention, FIG. 5 A, B, and C show a flow diagram representative of a router-cluster-node-centric configuration disseminated to each router cluster node 402.

Figure 5A:
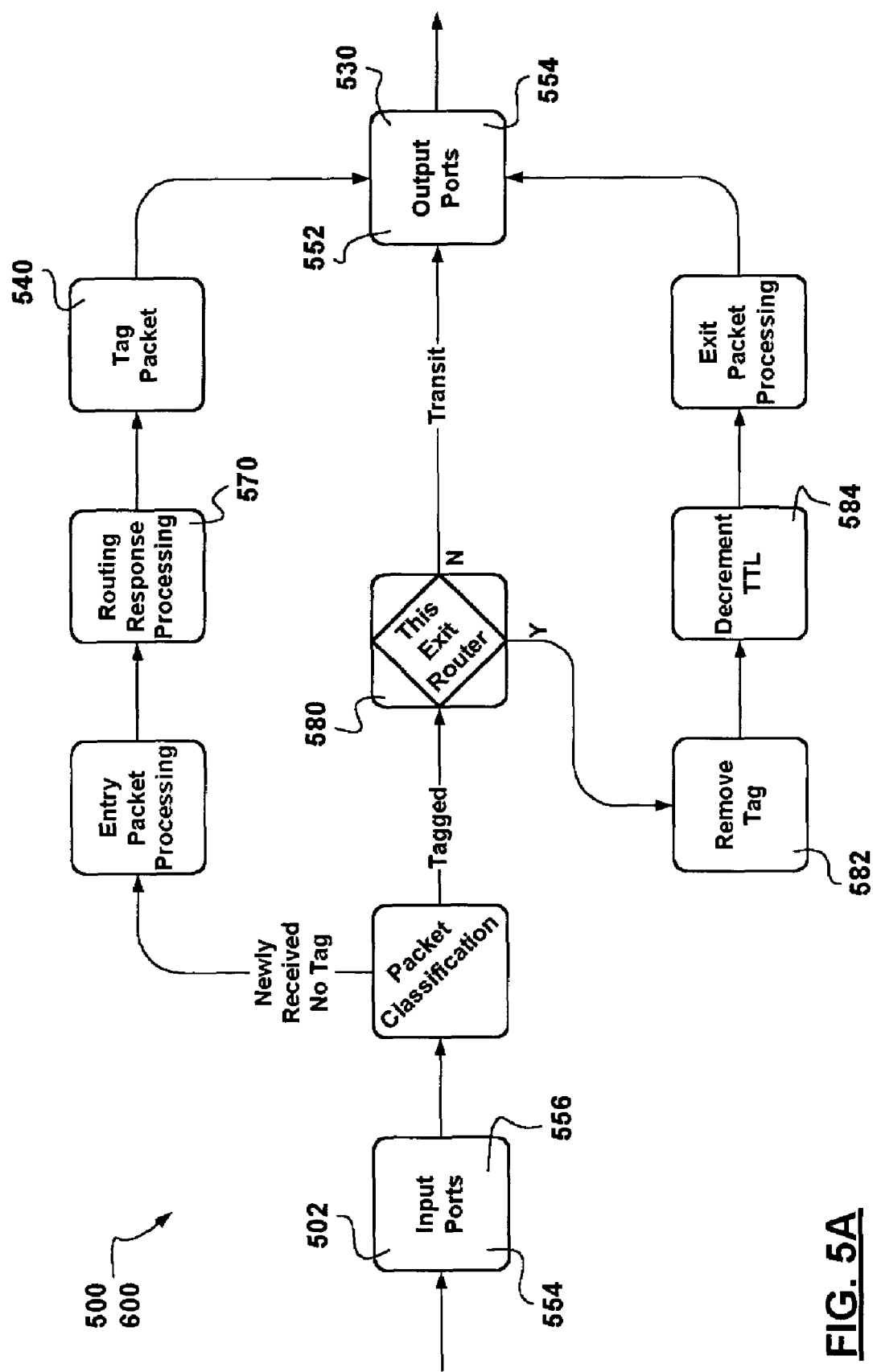
FIGS. 5 A, B and C are schematic flow diagrams showing exemplary packet processing flows and routing functional blocks providing packet routing in accordance with an exemplary embodiment of the invention.

FIG. 5A is a high level overview of the router-cluster-node-centric configuration 500 (600). In accordance with an exemplary implementation of the exemplary embodiment of the invention, the goal of determining a routing response for each received packet is divided into entry packet processing and routing response processing; and exit packet processing.

Each packet received via an input port 502, 554, 556 is classified to determine which leg of the configuration 500 to subject the packet to. Newly received packets via an external link are directed to an entry packet processing leg, whereby the packet undergoes entry packet processing and routing response processing. Subsequent to receiving a routing response 570, the packet is tagged 540 and forwarded via a cluster router external port 530, internal port 552 or the loopback port 554 as appropriate. The packet may propagate between router cluster nodes 402 before arriving at the exit router cluster node 402 by following the transit leg of the configuration 500.

The exit packet processing leg of the configuration 500 is typically followed upon receiving a packet via an cluster router internal port 556. The packet is then switched to and forwarded via the appropriate external port 530. The tag is removed 582 and the packet TTL is decremented 584 before packet transmission via an external link.

Figure 5B:
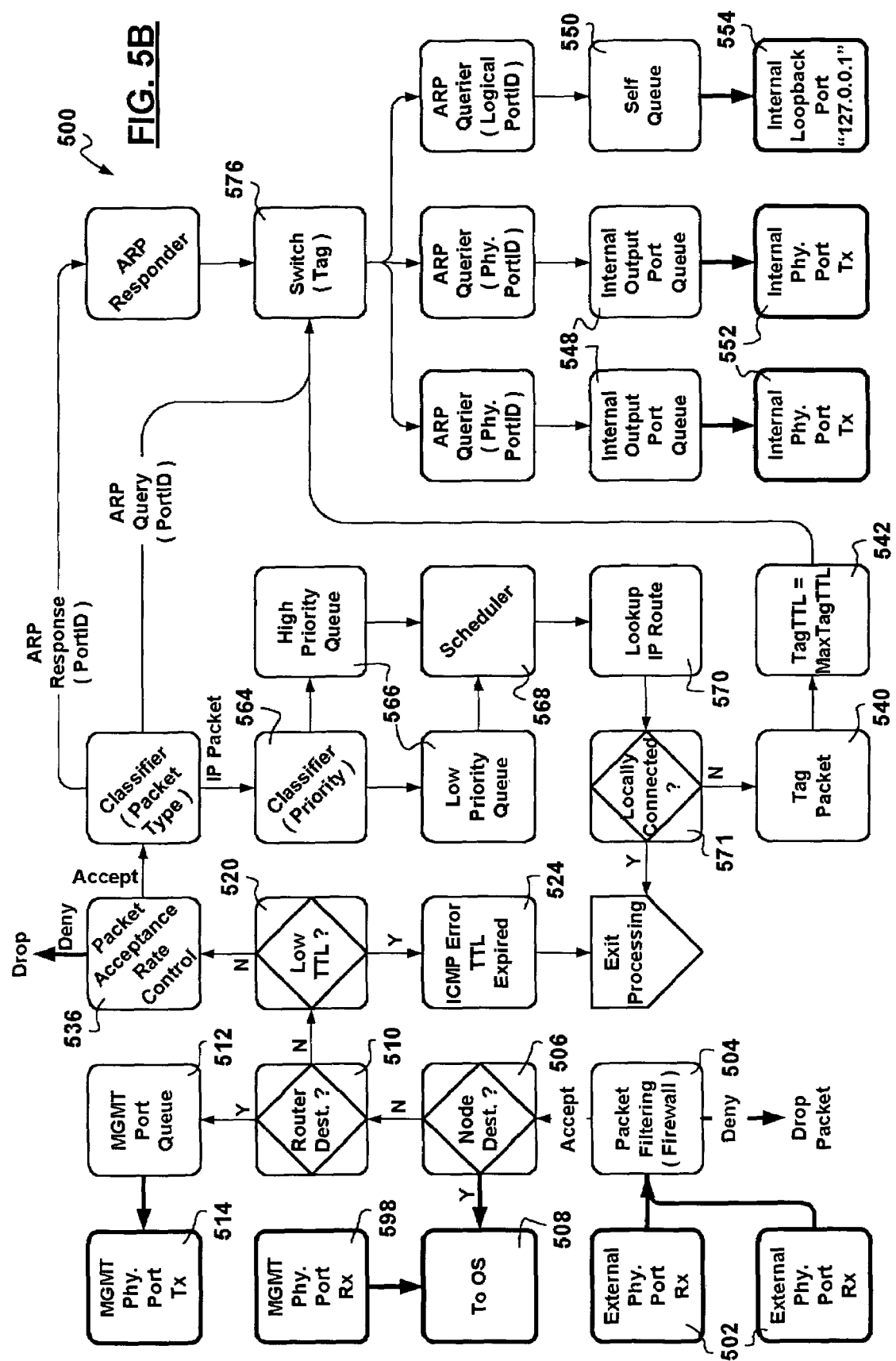

FIG. 5B shows details of the entry packet processing and routing response provisioning leg. A packet is received at the cluster router 400 via an external link and a corresponding external physical port 502. The received packet is typically provided to a packet filtering (firewall) block 504 exemplary subjecting the received packet to packet acceptance rules. If the packet is not accepted, the packet is dropped.

If the packet is accepted by the packet filtering block 504, the packet is forwarded to a decision block 506, which determines whether the packet is specifically destined for the subject router cluster node 402 currently processing the packet. If the packet is destined for the subject router cluster node 402, the packet is forwarded to the Operating System (OS), block 508—in this case the router cluster node operating system. If the packet is not destined for the router cluster node 402, it is forwarded on to decision block 510.

Decision block 510 determines whether the received packet is destined for the cluster router 400 proper. If the packet is destined for the cluster router 400, the packet is forwarded to a management port output queue block 512 and is eventually transmitted via a management output port 514 to a dedicated management node 410. If a router cluster node 402 is designated as a management node, then the packet is forwarded via an appropriate cluster router internal port 552 towards the designated management node. If the packet is not destined for the cluster router 400, in step 510, the packet is forwarded to decision block 520.

Decision block 520 inspects the packet header to obtain the packet TTL value. If the packet TTL value is too low, the packet is not processed any further with respect to providing a routing response. An ICMP Error "TTL Expired" message is formulated for the packet by block 524. The source and destination network node addressing specifications of the received packet are extracted and reversed, and the packet conveying the ICMP message is provided to the exit packet processing leg. As will be described with reference to FIG.

5C, the packet is placed on an output port queue 528 (lowest priority) of the external output port 530 corresponding to the input port 502 via which the packet was received. If the decision block 520 does not find a low packet TTL value, the packet is forwarded on.

The packet is typically (but not necessarily) subjected to a packet acceptance rate control block 536. The packet is further processed through various other entry packet processing blocks, for example to check the integrity of the packet header, to remove a number of bytes, etc, which will be omitted from being shown for brevity of the description of the exemplary embodiment presented herein. A person skilled in the art would specify the correct sequence of entry packet processing blocks necessary to support the services provided. Each such block typically performs a combination of: accepting the packet, modifying the packet header, dropping the packet with or without associated processing such as sending a message back, etc.

The packet is classified by classifier block 564 in accordance with the packet's priority for preferential processing and stored in a priority queue 566. Packets are scheduled for routing response processing by scheduler block 568 which preferentially selects high priority packets to be routed thereby enforcing quality of service guarantees. A route lookup is performed by lookup block 570.

Routing response processing results in the packet header being updated with next hop information including a network address of a next communications network node towards which the packet is to be conveyed upon leaving the cluster router 400, as well the tag information is updated with router cluster node addressing information (a MAC address specification) of the corresponding exit router cluster node 402.

Having received a routing response, decision block 571 determines whether the determined next hop network address is connected locally with respect to the subject router cluster node 402. If the network node corresponding to the next hop network address is connected to a port of to the subject router cluster node 402, then the packet is provided to the exit packet processing leg.

If the network node corresponding to the determined next hop address is not know locally, the packet is tagged (as described above) by tagging block 540. The tag includes a data structure conveyed with the packet. The data structure holds specifiers employed by router cluster nodes 402 to track the packet while in transit within the cluster router 400. A TagTTL specifier is populated with a MaxTagTTL value by block 542. It is worth re-emphasizing that the TagTTL value is independent of the packet TTL value specified in the packet header. The TagTTL value is decremented each time the packet propagates through a router cluster node 402, whereas the packet TTL value is decremented 584 only once as part of packet exit processing by the exit router cluster node 402.

The routed and tagged packet is provided to a switch block 576. The switch block 576, based on the tag information and perhaps header information, queues the routed packet in an internal output port queue 548 or the self queue 550. A packet conveying content will typically be queued in one of the internal output port queues 548 of the router cluster node 548, while packet encapsulated signaling and control messages may be queued in the self queue 550 to implement particular functionality.

Various other routing functions may be provided including, but not limited to, address resolution processing. As packets are exemplary transmitted employing the Internet Protocol (IP), an in-band Address Resolution Protocol (ARP) is employed to access address resolution services provided in a typical IP communication network. The processing of ARP packets is schematically shown in FIG. 5B. Without limiting the invention to the particular implementation shown, a classifier block classifies packets by type: IP packets are provided to classifier block 564, ARP responses are provided to an ARP responder block, ARP queries and packets processed by the ARP responder are switched by block 576 to respective output-port-associated ARP querier blocks. ARP functionality may also be implemented out-of-band via the management node 410.

Other routing (related) functionality such as, but not limited to: Reverse ARP (RARP), Border Gateway Protocol (BGP), etc. may be implemented in accordance with the exemplary embodiment by specifying an appropriate router-cluster-node-centric configuration.

Figure 5C:
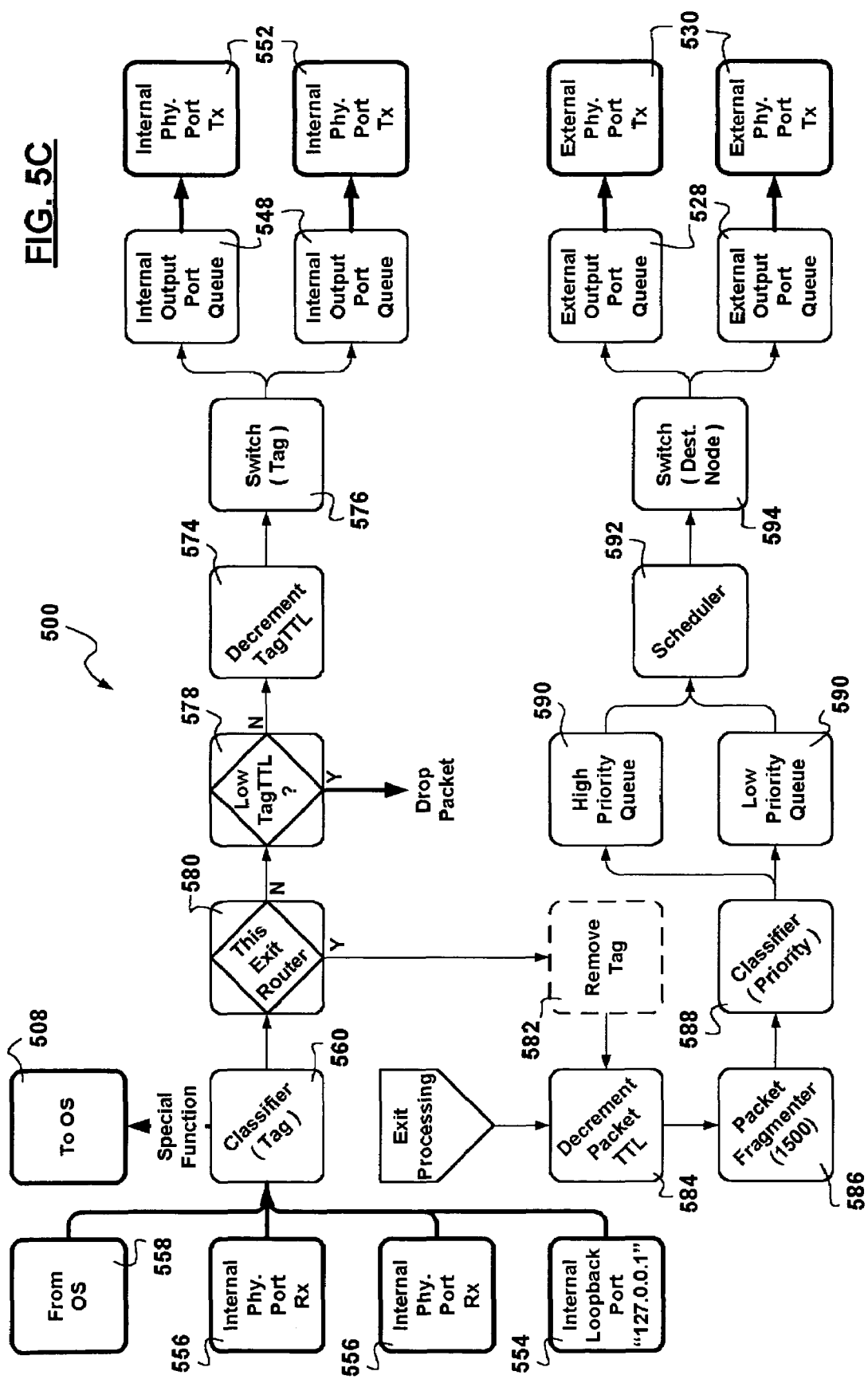

FIG. 5C shows router-cluster-node-centric configuration details related to processing packets received via an internal port 556, the logical loopback port 554, or from the operating system 558. Such packets may either require special functionality, transit, or exit processing.

A classifier 560 classifies received packets in accordance with information specified in the tag and perhaps also held in the packet header.

If the tag specifies that the received packet requires a special function, such as but not limited to: encryption/decryption, video stream processing (combine, decode, encode, format translation, etc.), authentication, directory services, etc., the packet is provided to the OS, block 508.

Decision block 580 determines whether the subject router cluster node 402 is the exit router cluster node specified in the tag.

If the router cluster node 402 is not the exit router cluster node, the packet is in transit. Decision block 578 determines whether the TagTTL value is zero. If the TagTTL value is zero, the packet is discarded thus preventing packets from circling between router cluster nodes 402 indefinitely. If the TagTTL value is not too low, the TagTTL value is decremented by block 574 and the packet is provided to the switch block 576 for forwarding.

If the subject router cluster node 402 is the exit router cluster node, as part of exit packet processing, the tag is removed by functional block 582, and the packet TTL is decremented by functional block 584. Not all received packets may be tagged, especially packets received via the loopback port 554. The configuration is exemplary of the flexibility provided.

A packet fragmenter block 586 fragments packets in accordance with transport characteristics of the external transport links beyond the router cluster node 402 and therefore beyond the cluster router 400.

A classifier block 588 classifies the packet in accordance with the packet's priority and the packet is stored in an appropriate priority queue 590.

A scheduler block 592, in accordance with a queue service discipline enforcing quality of service guarantees, provides packets from the priority queues 590 to a switch block 594 which takes into account the network address of the next hop communications network node held in the packet header of each packet provided, to determine the appropriate external output port 530 to forward the packet therethrough. The packet is queued for transmission in an external output port queue 528.

Making reference to FIG. 5B, the router cluster node may also receive a packet from the management port 598 which is forwarded to the OS 508.

Figure 6:
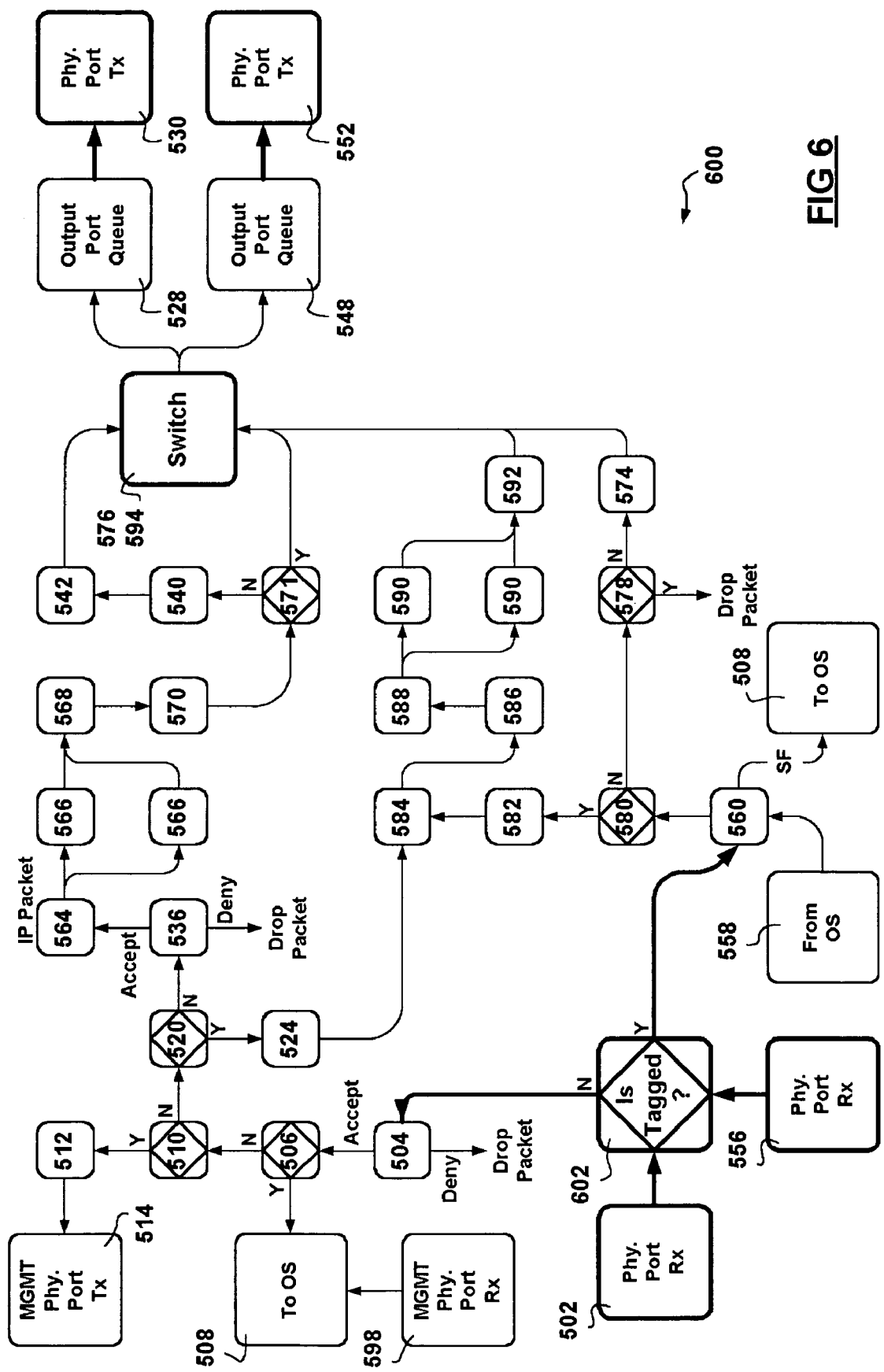
FIG. 6 is another schematic flow diagram showing exemplary packet processing flows and routing functional blocks providing packet routing in accordance with the exemplary embodiment of the invention.

As mentioned above, the separation between internal and external ports is not necessary. FIG. 6 shows schematically a router-cluster-node-centric configuration 600, corresponding to the router-cluster-node-centric configuration 500 presented in FIG. 5B and C, with packet processing flow specifications rerouted based on all ports being equivalent. All packets are provided to a decision block 602 determining whether a received packet is tagged or not.

The router cluster nodes 402 need not have the same processing capacity nor be supplied by the same equipment vendor, although use of same vendor equipment would reduce maintenance overheads typically associated with stocking replacement parts.

However, in providing improved packet processing capabilities, specialized PC platforms may be used for performing specialized packet processing. For example, as mentioned above, a packet payload encryption/decryption packet processing response may be necessary. Encryption/decryption algorithms may make use of specialized CPU processing functionality to speed up packet payload encryption/decryption. A difference exists between employing Complex Instruction Set Computing (CISC) platforms as opposed to Reduced Instruction Set Computing (RISC) platforms. Both CISC and RISC cluster nodes may however run the same operating system, Linux, and the exemplary router framework specially compiled for each specialized PC platform.

Therefore a low-cost, scalable cluster router design is provided. The routing functionality of the cluster router can easily be re-configured via modifying existing or employing additional special purpose routing functionality blocks to support varying customer needs, and different functional requirements. The routing functionality supported by and the configuration of the cluster router may also depend on where the cluster router is deployed in a communications network (edge/core/access).

A low-cost, scalable cluster router is useful as a communications network edge, where cost and scalability are very important. Such a cluster router could also be useful in small enterprise networks for the same reason. The cluster router design further provides a useful research tool due to its high degree of flexibility.

The embodiments presented are exemplary only and persons skilled in the art would appreciate that variations to the above described embodiments may be made without departing from the spirit of the invention. The scope of the invention is solely defined by the appended claims.

We claim:

1. A software configurable cluster-based router (400) for a packet-switched communication network, said cluster-based router including N cluster nodes (402) connected by a plurality of internal links (404), characterized by:
   a plurality of external links for enabling said cluster-based router to exchange traffic with a plurality of nodes of said packet-switched communication network;
   each cluster node of said N cluster nodes (402) being adapted to operate as a core router cluster node and as an edge router cluster node;
   the internal links (404) connect said cluster nodes in an intra-connection network adapted to provide a high path diversity for a plurality of packet processing flows routed over said intra-connection network between edge router nodes; and
   the cluster nodes connected to external links being adapted to operate as edge router cluster nodes,
   whereby a specified routing capacity is obtained for said cluster-based router by selecting N and selecting a configuration of said intra-connection network, said configuration having n dimensions, said cluster nodes being interconnected by said internal links in such a way that each of said cluster nodes is connected to two other cluster nodes in each of said dimensions, each of said cluster nodes thereby being connected to 2*n said internal links.

2. A software-configurable cluster-based router as claimed in claim 1, wherein each cluster node (402) is a personal computer.

3. A software-configurable cluster-based router as claimed in claim 1, wherein said specified configuration comprises an n dimensional topology, each cluster node being connected to 2*n neighboring cluster nodes (402).

4. A software-configurable cluster-based router as claimed in claim 1, further comprising:
   an additional cluster node (410) adapted to operate as a management node for managing operation of said cluster nodes of said intra-connection network; and
   dedicated management links (412) for enabling said additional cluster node to communicate with said cluster nodes.

5. A software-configurable cluster-based router as claimed in claim 4, wherein said management links (412) form a star or a bus topology.

6. A software-configurable cluster-based router as claimed in claim 1, wherein each cluster node comprises a plurality of routing, functional blocks, all said cluster nodes comprising the same routing functional blocks.

7. A software-configurable cluster-based router as claimed in claim 1, wherein each cluster node uses an internal addressing process for dynamically determining a node address of each cluster node (402) on said intra-connection network.

8. A software-configurable cluster-based router as claimed in claim 1, wherein said cluster nodes use an external addressing process for dynamically determining a router address for said cluster-based router (400) on said communication network.

9. A software-configurable cluster-based router as claimed in claim 6, wherein said routing functional blocks comprise:
   entry packet processing and routing response processing blocks, adapted to route an untagged packet to an output port of the output ports of said cluster node;
   exit packet processing blocks adapted to route a tagged packet to an output port of the output ports of said cluster node;
   a packet classification unit connected to input port of said cluster node adapted to route said untagged packet received on said input port over an external link to said entry packet processing and routing response processing blocks, and to route said tagged packet received on said input port over an internal link to said exit packet processing blocks.

10. A software-configurable cluster-based router as claimed in claim 9, wherein said entry packet processing and routing response processing blocks includes:
   a decision block (506, 510, 520, 533) for determining if said untagged packet needs to be processed at said cluster node; and
   a routing response processing block (570) for performing a route lookup on said untagged packet and routing said untagged packet into an output queue corresponding to said output port.

11. A software-configurable cluster-based router as claimed in claim 9, wherein said entry packet processing and routing response processing blocks include a tag packet block (540) for attaching a tag to said untagged packet.

12. A software-configurable cluster-based router as claimed in claim 11, wherein said exit packet processing blocks include a decision block (580) for determining whether said cluster node is an exit edge cluster node.

13. A software-configurable cluster-based router as claimed in claim 11, wherein said exit packet processing blocks include a remove tag block (582) for removing said tag from said tagged packet if said cluster node is an exit edge cluster node.

14. software-configurable cluster-based router as claimed in claim 9, further comprising a decision block (510) for determining if said untagged packet is a router management packet and routing said untagged packet to a management node (410) of said cluster based router.

15. A software-configurable cluster-based router as claimed in claim 11, wherein said tag is provided as an optional packet header, a packet trailer, or an additional header.

16. A method of routing packets over a cluster-based router (400) with a configurable routing capacity and port count, comprising the steps of:
   i) selecting a number N and a configuration for said cluster-based router for obtaining a specified routing capacity and port count for said cluster-based router, said configuration having n dimensions, said cluster nodes being interconnected by said internal links in such a way that each of said cluster nodes is connected to two other cluster nodes in each of said dimensions, each of said cluster nodes thereby being connected to 2*n said internal links,
   ii) connecting N cluster nodes (402) via internal links in an intra-connection network according to said configuration;
   iii) connecting a selected number of cluster nodes designated to operate as edge router cluster nodes over a plurality of external links for enabling connection of said cluster-based router in a communication network; and
   iv) routing packets along packet processing flows established between two edge router cluster node over a plurality of core router cluster nodes.

17. A method as in claim 16, wherein whenever one of said cluster nodes is affected by a failure, the remaining cluster nodes take over the functionality of said failed cluster node.

18. A method as claimed in claim 16, wherein step iv) comprises providing each cluster node with a node MAC address on said intra-connection network, and providing each port of said cluster node with a unique port MAC address.

19. A method as claimed in claim 18, wherein said node MAC address is set to the lowest MAC address of all ports of said respective cluster node.

20. method as claimed in claim 16 further comprising using a dynamic internal cluster router MAC address determination process for establishing a router MAC address for said cluster-based router.

21. A method as claimed in claim 16, wherein step iv) comprises:
   attaching a tag to each new packet received on an input port of an edge router cluster node; and
   differentially processing packets at each cluster node according to the presence or absence of said tag, whereby:
   said packet is routed towards another cluster node if it is addresses to said another cluster node, or said tag is removed and said packet is routed to an edge node for transmission over said communication network.

* * * * *